Feb. 17, 1970 M. H. C. BUTTERY 3,496,456
APPARATUS FOR REDUCING AND SENSING DISTORTION
IN CONTAINER SIDE SEAMS
Filed March 10, 1965 3 Sheets-Sheet 1

Inventor
Michael Harcourt Christians Buttery
By
Mason, Porter, Diller & Brown
Attorneys

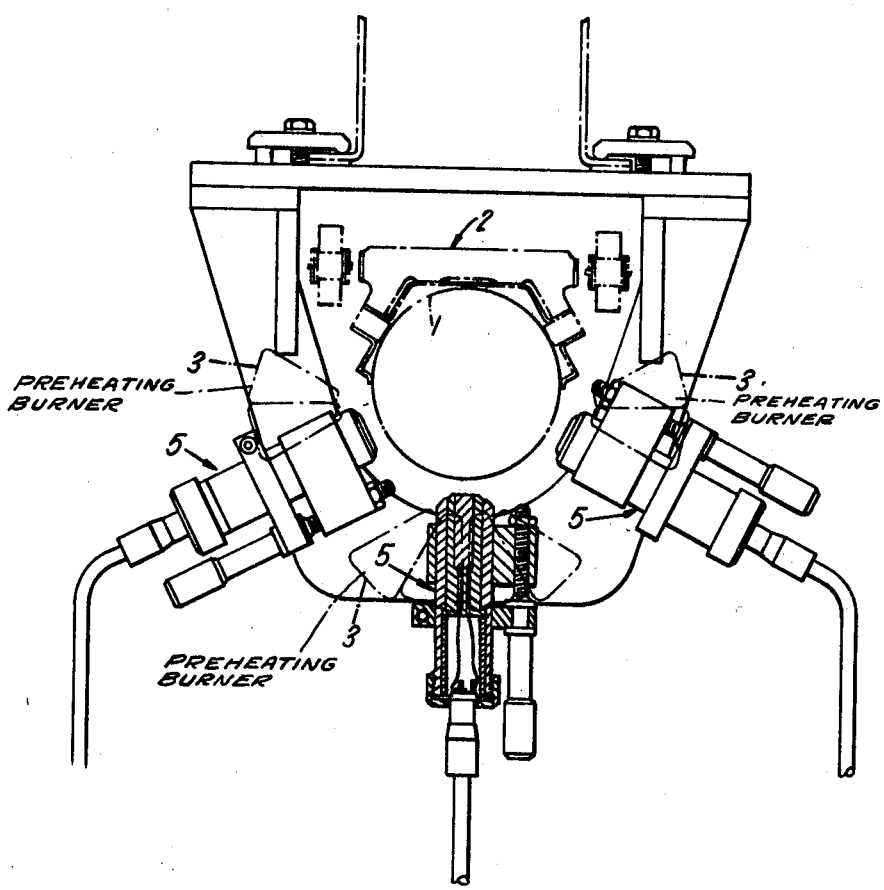

United States Patent Office 3,496,456
Patented Feb. 17, 1970

3,496,456
APPARATUS FOR REDUCING AND SENSING DISTORTION IN CONTAINER SIDE SEAMS
Michael Harcourt Christians Buttery, Bushey Heath, England, assignor to The Metal Box Company Limited, London, England, a British company
Filed Mar. 10, 1965, Ser. No. 438,699
Claims priority, application Great Britain, Mar. 16, 1964, 11,026/64
Int. Cl. G01r 33/00
U.S. Cl. 324—34                         10 Claims

ABSTRACT OF THE DISCLOSURE

Disclosed herein is an improvement in container forming apparatus including means for minimizing and sensing distortion in container side seams prior to the soldering thereof. Such apparatus includes means for heating the container along the side seam thereof and in portions removed from the side seam thereof during the axial movement of the container along a path of conveyance. Detector means including inductive coils are placed to be proximate to the side seam and further areas of the container during the movement along the path of conveyance and bowing or distortion in the container body resultant from temperature differentials within the container body effects a variation in the inductance of the coils. The coils are connected to suitable detectors for providing an output representative of the variations in distance between the inductive coils and the container body and such output is fed through an inverter to a suitable recorder capable of charting such variations in distance.

---

This invention relates to the manufacture of can bodies of circular cross-section.

As is well understood, can bodies of circular cross-section are usually made on a body making machine which shapes flat sheets into cylinders having longitudinal seams formed by interlocked hooks extending lengthwise of the cylinders. The bodies are moved axially in succession to soldering devices which apply solder to the seams and prior to the application of the solder the bodies are locally heated about the region of the seam to facilitate the soldering operation. Naturally, the metal of a can body when so locally heated along its length expands towards the source of heat due to the differential expansion between the hot and cold portions of the body and this causes bowing of the body along the length thereof so that the seam is not straight as is desired for the proper soldering thereof. To overcome this difficulty it is usual to apply heat to the sides of the body in a manner which tends to expand the sides of the body outwards and so straighten the seam and abviate the distortion effects of the pre-heating of the seam.

The heating devices used are capable of adjustment but heretofore it has been necessary when starting up the body making and soldering machines to effect adjustment of the heating devices by trial and error until the seams are substantially straight when presented to the soldering device, and no ready means have been available to give an indication when unsuitable seams are presented to the soldering device.

It is an object of the present invention to provide apparatus for measuring and recording the amount of bowing on the side and bottom of a can body as the result of pre-heating thereof preparatory to soldering of the longitudinal seam of the body, which record will give a visual indication of the amount of bowing of each body and which can provide a record capable of use for setting purposes when starting up the body making and soldering machines.

According to the invention there is provided apparatus for measuring and recording the amount of bowing on the side and bottom of a can body as the result of pre-heating thereof preparatory to soldering of the longitudinal seam of the body, comprising inductance coils supported to be in close proximity with the paths of the pre-heated side and bottom portions of a can body and electrically connected through detector units and an inverter unit with twin channel pen recorder operable to make traces on a record element whereby inductance variations due to the proximity of a can body with the coils are recorded on the record element.

In order that the invention may be clearly understood one embodiment thereof will now be described, by way of example, with reference to the accompanying drawings, in which:

FIGURE 2 is a section on line II—II, FIGURE 1,

Figure 1:
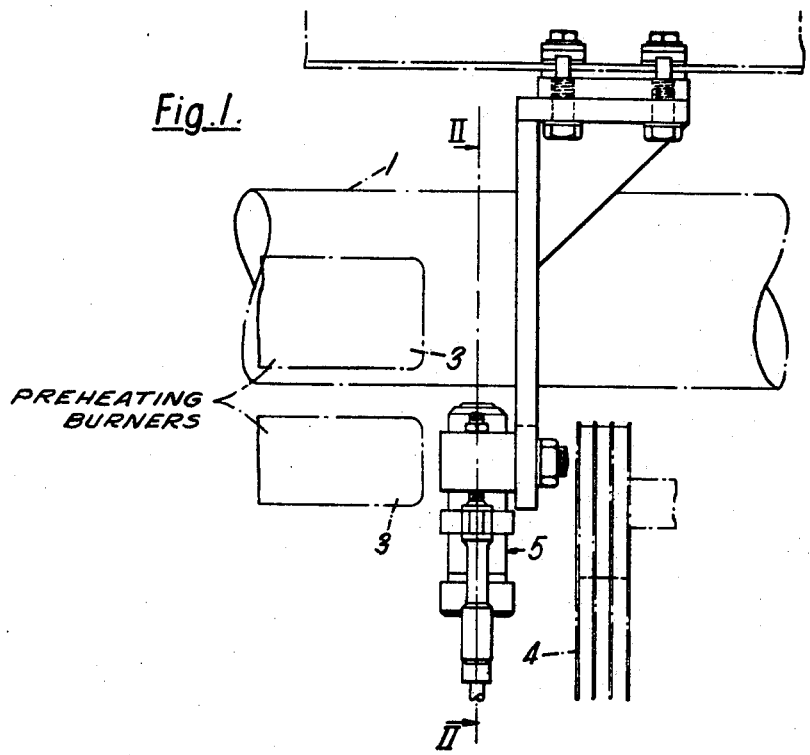
FIGURE 1 is a side elevation of a part of a body-making and soldering machine having apparatus according to the invention applied thereto.
Figure 3:
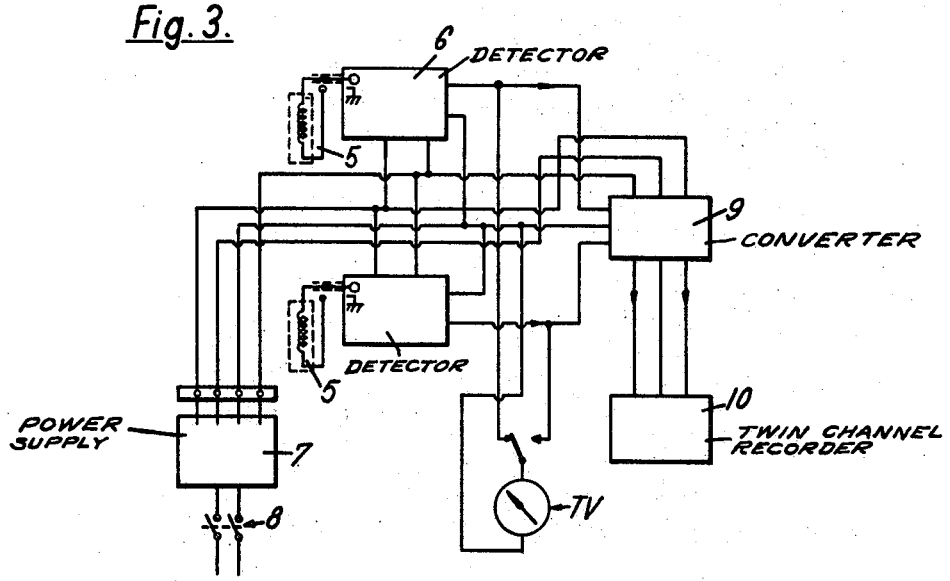
FIGURE 3 is an electrical circuit diagram.

Referring to FIGURES 1 to 3 of the drawings, can bodies 1, shown in broken lines, are moved axially in succession by any suitable conveyor means. As indicated in broken lines in FIGURE 2 the conveyor means 2 is of the kind described in British patent specification No. 881,962. The bodies are moved from the body maker, not shown, past pre-heating burners 3 of which there are three, one supported directly beneath the path of the can bodies to heat the same, and two which are arranged to heat the sides of the bodies. The conveyor means carries the bodies past the heater means and then past a soldering roller, not shown, driven by a chain 4, FIGURE 1.

Between the heating burners 3 and the soldering roller three inductance coils 5, of any suitable known form, are supported to be in close proximity to the paths of the pre-heated side and bottom portions of the can bodies. The coils 5 are aligned one with each of the heating burners 3.

Figure 4:
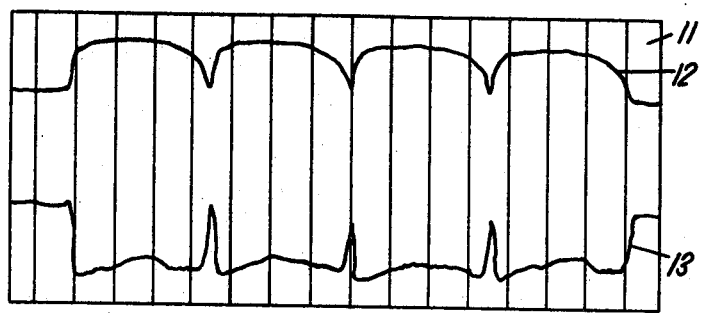
FIGURES 4 to 6 illustrate typical recordings made by the apparatus.
Figure 5:
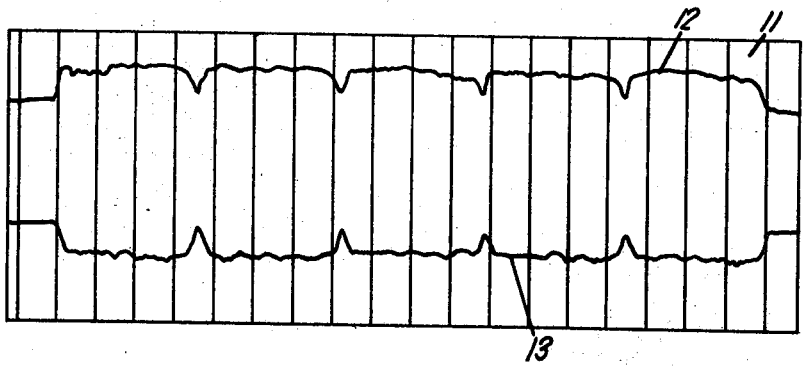
Figure 6:
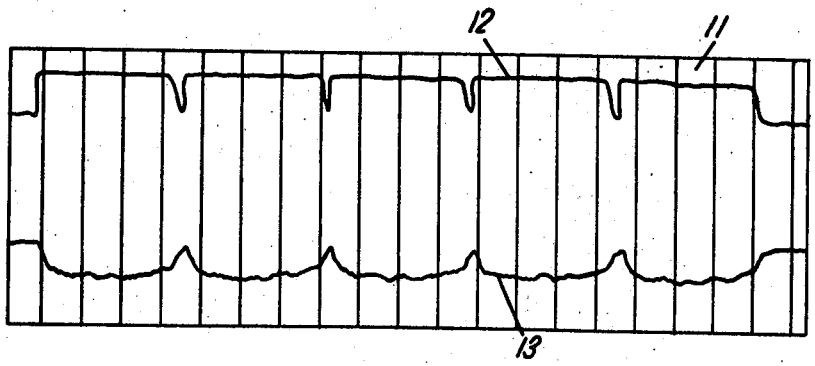

Each inductance coil is connected electrically with an electronic detector unit 6, FIGURE 3, of known form and the detector units are connected with a power supply unit 7 connected to a source 8 of mains electrical supply and with an inverter unit 9, also of known form, which in turn is connected with pens, not shown, of a twin channel pen recorder 10 of any suitable kind arranged to make traces on a record element II, FIGURES 4 to 6, indicative of the shape of the bodies passing the coils 5. A tuning indicator voltmeter TV is included in the circuit for the purpose of tuning the circuit.

When the apparatus is in operation the inductance of the coils 5 is altered by the proximity of a can body being moved past them by the conveyor means 2 and this alteration is measured by the detector units 6, is amplified by the inverter unit 9 and drives the pens of the pen recorder 10. One of the pens records variations of the side-sensing coils 5 and the other records variations of the bottom-sensing coil 5. Whereas only one of the side seam sensing coils 5 is shown in FIGURE 3, each such coil is associated with a detector 6 and may be employed singly, at the preference of the operator, to provide a trace indicative of distortion in the associated can body area or the output from the side sensing coils 5 and their associated detectors may be combined in any known fashion and applied to provide a trace indicative of the distortion occurring in either area associated with the side sensing coil 5.

FIGURES 4 to 6 illustrate typical recordings made by the apparatus, the recording of FIGURE 4 illustrating the traces made when the bottom heating burners are inoperative and the side heating burners are operative, the pulses appearing in the traces of FIGURES 4 through 6 corresponding to the separation between serially conveyed can bodies, the recording of FIGURE 5 illustrating the traces made when both the side and the bottom heating burners are operative, and FIGURE 6 illustrating the traces made when the bottom heating burners are operative and the side heating burners are inoperative. In each of FIGURES 4 to 6 the traces 12 are those made by the pen controlled by the coils 5 sensing the can body side profiles and the traces 13 are those made by the pen controlled by the coil 5 which senses the can body seam profile.

It will be understood that the traces 12, 13 provide an instant visual indication as to the condition of the seam as it is about to pass to the soldering roller so that, if necessary, adjustment of the heating burners can be immediately effected. Further, for any given body making and soldering machine, there can be prepared a master set of traces together with a note of the burner settings used to obtain the master set and this can be employed for providing a quick initial setting of the burners when starting up the machine because by using the master settings the new traces should be closely comparable with the master traces and any deviation from the master traces will give a ready indication as to the nature of the adjustment required in order that the new traces shall correspond with the master traces.

I claim:

1. In can forming apparatus for sealing side seams in generally tubular can bodies and in which the can bodies are moved axially along a path of movement prior to the sealing of the side seams; heating means disposed adjacent the path of movement of the can bodies for heating a predetermined portion of said can bodies during movement along said path and sensing means including sensor means disposed adjacent said path in close proximity thereto for indicating distortion in the can bodies resultant from the heating thereof by said heating means, said sensor means being mounted, in its entirety, in fixed relation to said path on movement intermediate said heating means and the point of sealing of the side seams for continuously monitoring the displacement from said path of can bodies in transit.

2. Apparatus according to claim 1 wherein said heating means comprises side seam heater means for heating the side seam area of the can bodies during movement along said path, said sensor means comprising proximity sensor means fixedly aligned with said side seam heater means for indicating bowing in the can side seam resultant from differential heating of the can bodies by the heating means.

3. Apparatus according to claim 2 wherein said proximity sensor means comprises an inductance coil closely adjacent the side seam portion of said path of can body movement, said sensor means further comprising detector means connected to said coil for detecting variations in inductance of said coil resultant from temperature differential distortion produced variations in the proximity of said coil and a can side seam.

4. Apparatus according to claim 1 wherein said heater means comprises a plurality of can body heaters angularly displaced about the path of movement of the can bodies for heating the can bodies in the portion thereof including the side seam and in at least one portion removed from the side seam, said sensor means comprising at least one proximity sensor means for indicating the variations in proximity of the can to the sensor means resultant from temperature differential distortion in the can bodies.

5. Apparatus according to claim 4 wherein one of said can body heaters is disposed adjacent that portion of the path of movement in which the can side seams move for heating the can body along the side seam thereof, said at least one proximity sensor means being located adjacent the side seam portion of said path of movement intermediate said heaters and the point of sealing of the side seams for indicating variations in proximity resultant from bowing of the side seam prior to the sealing thereof.

6. Apparatus according to claim 5 wherein said sensor means further comprises at least one further proximity sensor means angularly displaced from said at least one proximity sensor means for indicating distortion in the at least one can portion removed from the side seam.

7. In container forming apparatus for soldering side seams in generally tubular container bodies and in which the container bodies are axially conveyed prior to the soldering of the side seams; means for heating the container side seam to a soldering temperature, and for heating a container portion removed from the side seam to reduce temperature differential distortion in the container body, sensing means comprising proximity sensor means mounted in fixed relation to the path of conveyance intermediate the means for heating and the point of soldering of the side seams for detecting temperature differential induced variations in the distance from the container side seam to said proximity sensor means during axial conveyance of a container body therepast.

8. Apparatus according to claim 7 wherein said sensing means further comprises at least one further proximity sensor means for detecting the proximity of the heated container portion removed from the side seam.

9. Apparatus according to claim 7 wherein said proximity sensor means comprises an inductance coil closely adjacent the path of movement of the side seam during axial conveyance of a container body, said sensing means further comprising detector means electrically connected to said inductance coil for producing signals representative of the proximity of said coil to said container body side seam, recorder means for recording the proximity of said coil to said container body side seam, and inverter means interconnecting said detector means and said recorder means for supplying signals to said recorder means for the recording thereof.

10. Apparatus according to claim 8 wherein said at least one proximity sensor means and further proximity sensor means each comprises an inductance coil closely adjacent the path of movement of the container body during axial conveyance thereof, said sensing means further comprising detector means electrically connected to each of said inductance coils for producing signals representative of the proximity of said coil to said container body, recorder means for recording the proximity of said inductance coils to said container body during the axial conveyance thereof, and inverter means interconnecting said detector means and said recorder means for supplying signals to said recorder means for the recording thereof.

References Cited

UNITED STATES PATENTS

| | | | |
|---|---|---|---|
| 2,356,968 | 8/1944 | Barnes et al. | 324—37 |
| 3,286,168 | 11/1966 | Schmidt | 324—37 |
| 2,719,953 | 10/1955 | Waldie | 324—37 |

FOREIGN PATENTS

| | | |
|---|---|---|
| 575,219 | 5/1959 | Canada. |
| 160,855 | 4/1921 | Great Britain. |
| 729,884 | 5/1955 | Great Britain. |
| 219,678 | 1/1959 | Australia. |
| 881,643 | 4/1943 | France. |
| 984,762 | 7/1951 | France. |

RUDOLPH V. ROLINEC, Primary Examiner

R. J. CORCORAN, Assistant Examiner

U.S. Cl. X.R.

72—11, 701